US006226097B1

(12) United States Patent
Kimura

(10) Patent No.: US 6,226,097 B1
(45) Date of Patent: May 1, 2001

(54) PRINT INTERRUPTION METHOD, AND INFORMATION PROCESSING APPARATUS, OUTPUT CONTROL APPARATUS, PRINT INTERRUPTION SYSTEM AND PRINT INTERRUPTION PROGRAM-STORED STORAGE MEDIUM, USED IN THE METHOD

(75) Inventor: Mitsuo Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/996,816

(22) Filed: Dec. 23, 1997

(30) Foreign Application Priority Data

Dec. 27, 1996 (JP) .................................................. 8-349626
Oct. 1, 1997 (JP) .................................................. 9-268664

(51) Int. Cl.$^7$ .................................................. G06K 15/00

(52) U.S. Cl. ........................................ 358/1.14; 358/1.15

(58) Field of Search .................................. 358/1.14, 1.9, 358/1.15

(56) References Cited

U.S. PATENT DOCUMENTS

| 5,018,079 | * | 5/1991 | Shukunami | 364/519 |
| 5,483,621 | * | 1/1996 | Ohtaka | 395/110 |
| 5,706,412 | * | 1/1998 | Kojo | 395/113 |
| 5,841,699 | * | 11/1998 | Miyauchi | 365/185.33 |
| 5,918,071 | * | 6/1999 | Kojo | 395/113 |

* cited by examiner

Primary Examiner—Jerome Grant, II
(74) Attorney, Agent, or Firm—Fitzpatrick, Cella, Harper & Scinto LLP

(57) ABSTRACT

An apparatus capable of normally printing when the transmission of print data is interrupted by a user is provided. When the transmission of print data is interrupted by the user, a computer transmits an interruption command to a printer, and the printer totally clear the received data if it has determined that the interruption command is included in the received data. Otherwise, the size information of the print data is transmitted in advance, and determination of whether or not the print data can totally be received is performed by comparing the size of the received print data and the size information when the transmission of the print data ends. In the above manner, no data remains inevitably in a buffer in the printer when the process of one job ends, which enables the next printing.

22 Claims, 14 Drawing Sheets

RELATIONSHIP BETWEEN
CLIENT PC AND FD

PRINT INTERRUPTION METHOD, AND INFORMATION PROCESSING APPARATUS, OUTPUT CONTROL APPARATUS, PRINT INTERRUPTION SYSTEM AND PRINT INTERRUPTION PROGRAM-STORED STORAGE MEDIUM, USED IN THE METHOD

BACKGROUND OF THE INVENTION

1. Field of the Invention

The present invention relates to a method in which, when print data is transmitted for printing from a computer via a network to a printer using a page description language, such as a laser-beam-printer image processing system, the transmission of the print data from the computer to the printer can be discontinued to interrupt printing. The present invention also relates to an apparatus and system for realizing the method, and a program-stored storage medium used in the apparatus and system.

2. Description of the Related Art

A conventional operating system (hereinafter referred to as an "OS") such as "Windows" (trademark) converts print data produced by an application into a printer language characteristic of a printer before transmitting the print data to the printer. If interruption of the transmission of the print data is requested by a user, the OS interrupts the transmission of the print data to the printer when the interruption is requested by the user. However, even if the computer interrupts the transmission of the print data, any print data which has already been transmitted is received by a receiving buffer in the printer. In addition, the printer processes successively received print data as the remainder of the partly transmitted print data. Accordingly, when other print data is newly transmitted to the printer, if the printer is a type using a page description language, the newly transmitted data connects with the partly transmitted print data to cause errors such as character changes, which discontinues normal printing.

SUMMARY OF THE INVENTION

Accordingly, it is an object of the present invention to provide a print-interruption method and apparatus capable of continuing normal printing even if a user requests interruption of data transmission and performs the next printing.

It is another object of the present invention to provide a print-interruption method and apparatus in which, when the connection between a printer and an external unit during data transmission is broken due to some reason, and normal data transmission has failed, normal printing is continuable even if a user performs the next printing.

It is a further object of the present invention to provide a print-interruption method and apparatus in which, when no data is transmitted to a printer for a long period, a process for no data is performed and the next printing is normally continuable.

To this end, according to an aspect of the present invention, the foregoing objects have been achieved through provision of a print system including a computer and a printer connected to each other, in which the computer comprises: transmission means for transmitting print data to an external unit; and control means for controlling the transmission means to transmit a print-interruption request when receiving the print-interruption request while the print data is being transmitted by the transmission means, and in which the printer comprises: receiving means for receiving print data from an external unit; analysis means for analyzing the print data received by the receiving means; storage means in which the print data received by the receiving means is stored; erasing means for erasing the print data stored in the storage means; and erasing control means for controlling the erasing means to erase the print data stored in the storage means when a print-interruption request in the received data is found by the analysis means.

According to another aspect of the present invention, the foregoing objects have been achieved through provision of a print system including a computer and a printer connected to each other, in which the computer includes: transmission means for transmitting data to an external unit; and control means for performing control so that, while the transmission means is transmitting print data to the external unit after transmitting the print data and size information thereof, when the control means receives a print interruption request, the transmission of the print data is discontinued, and in which the printer includes: receiving means for receiving print data and size information thereof from an external unit; storage means in which the print data received by the receiving means is stored; calculation means for calculating the size of the print data received by the receiving means; comparison means for comparing the print data size calculated by the calculation means and the size information received by the receiving means; erasing means for erasing the data stored in the storage means; and control means for performing control so that, when the print data size and the size information, compared by the comparison means, differ at the end of the reception of the print data from the receiving means, the data stored in the storage means is erased by the erasing means.

According to a further aspect of the present invention, the foregoing objects have been achieved through provision of a print system including a computer and a printer connected to each other, in which the computer includes: holding means for holding print data converted into a printer language in the form of a file; transmission means for transmitting the print data to an external unit; and control means for performing control so that, when the control means receives a print interruption request while the print data is being transmitted to the external unit by the transmission means, the print data is continuously transmitted up to the end of a page being transmitted before the transmission is interrupted, and in which the printer includes: receiving means for receiving print data transmitted from the external unit; expansion means for expanding the print data received by the receiving means into image data; output means for outputting the image data formed by the expansion means; and output-control means for performing control so that, when the reception of the print data from the external unit ends, the print data received by the receiving means is expanded by the expansion means, and the expanded print data is output by the output means.

According to a still further aspect of the present invention, the foregoing objects have been achieved through provision of an output control apparatus comprising: receiving means for receiving print data from an external unit; storage means in which the print data received by said receiving means is stored; erasing means for erasing the print data stored in said storage means; derivation means for deriving time information representing a lapse of time from the final reception of the print data by said receiving means; and control means for performing control so that, while the transmission of the print data from said external unit does not end, when a time based on the time information derived by said derivation means is more than a predetermined time, the print data stored in said storage means is erased by said erasing means.

According to the present invention, a printer or network printer can be notified of the interruption of print data transmission by a command, and the print data already transmitted for part of one page can be erased from the buffer of the network printer. As a result, after the transmission of the print data from the computer is interrupted, if another print data is transmitted to the network printer, the network printer can continue normal printing.

According to the present invention, the printer or the network printer can be notified of the interruption of print data transmission by the breaking of the connection to the computer, and print data already transmitted for part of one page can be erased from the buffer of the network printer. As a result, after the transmission of the print data from the computer is interrupted, if another print data is transmitted to the network printer, the network printer can continue normal printing.

According to the present invention, the transmission of print data can be interrupted after the print data is transmitted up to a page end. As a result, after the transmission of the print data from the computer is interrupted, if other print data is transmitted to the network printer, the network printer can continue normal printing.

According to the present invention, when no data is transmitted from an external unit for a certain period in the reception of data, the connection with the external unit can compulsorily be broken by a timeout process. As a result, if other print data is transmitted from a computer to the network printer, the network printer can continue normal printing.

DESCRIPTION OF THE PREFERRED EMBODIMENTS

At first, a virtual print-server system as a premise of the present invention will be described below.

Figure 1:
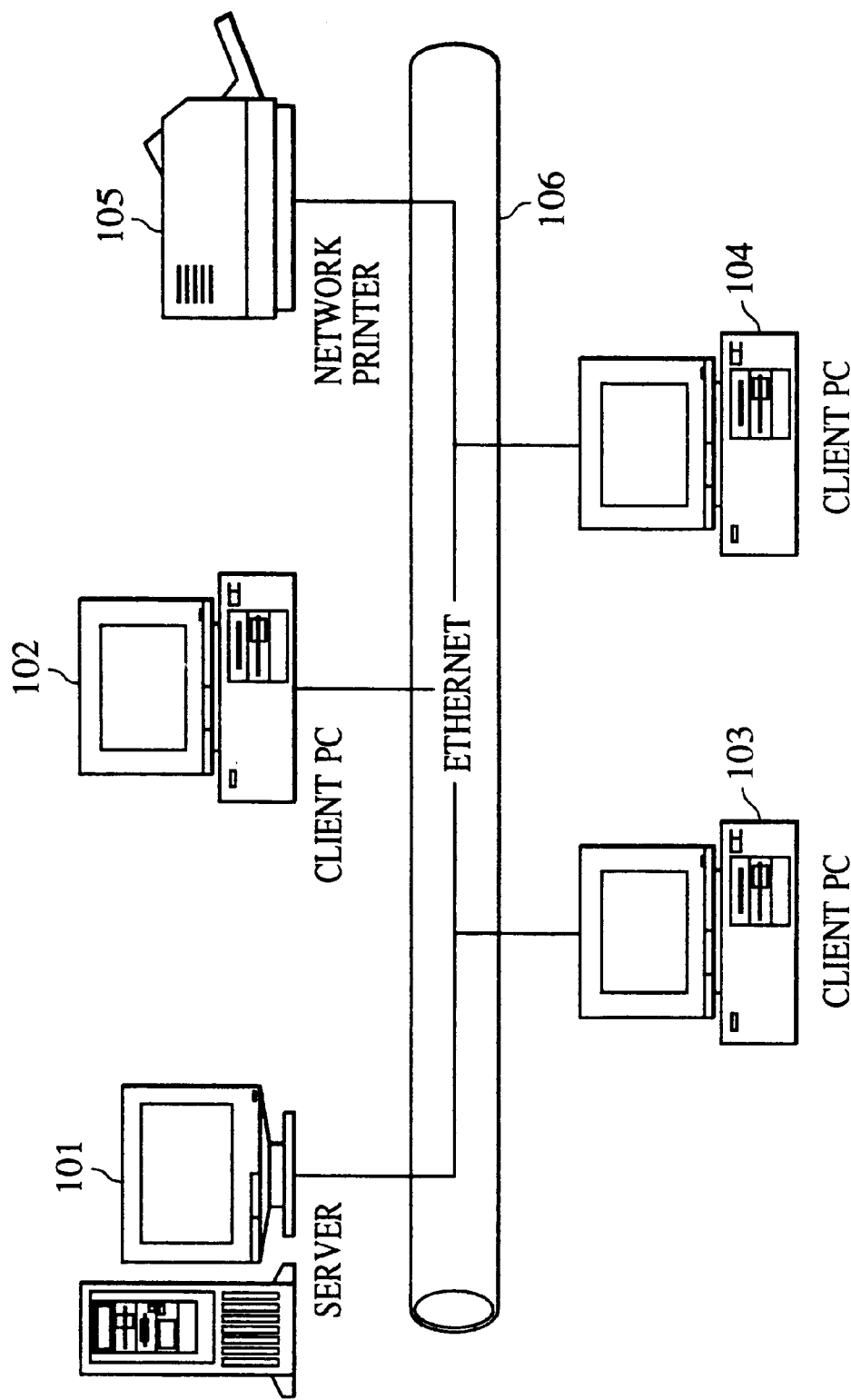
FIG. 1 is a block diagram showing a network system to which a virtual server according to the present invention is applied.

FIG. 1 shows a block diagram of a network system to which the virtual print-server system is applied.

In FIG. 1 it is assumed that n client personal computers (hereinafter referred to as "client PCs") are connected. Client PCs 102, 103 and 104 connected to a network 106 by a network cable can execute various types of programs such as application programs, and they are provided with a printer driver having the function of converting print data to a printer language corresponding to each printer. The printer driver is adapted for a plurality of printer languages. A server 101 connected to the network 106 by the network cable accumulates files to be used in the network, and monitors the operating condition of the network 106. The server 101 is also provided with the functions of storing job information about print data on which print requests have been output from the client PCs 102, 103 and 104, and notifying each client PC of the IP information of a network printer 105 and the job information received by a buffer in the network printer 105. The network printer 105 is connected to the network 106 via a network interface and converts print data transmitted from each client PC into a dot-image page by page, and prints the dot-image. The network 106 is connected to the server 101, the client PCs 102, 103 and 104, and the network printer 105.

In such a manner, the functions of the network system are shared by the server 101, the client PCs 102, 103 and 104, and the network printer 105, respectively. Thereby, the client PCs 102, 103 and 104 are efficiently used, and loads to the network system are reduced.

Figure 2:
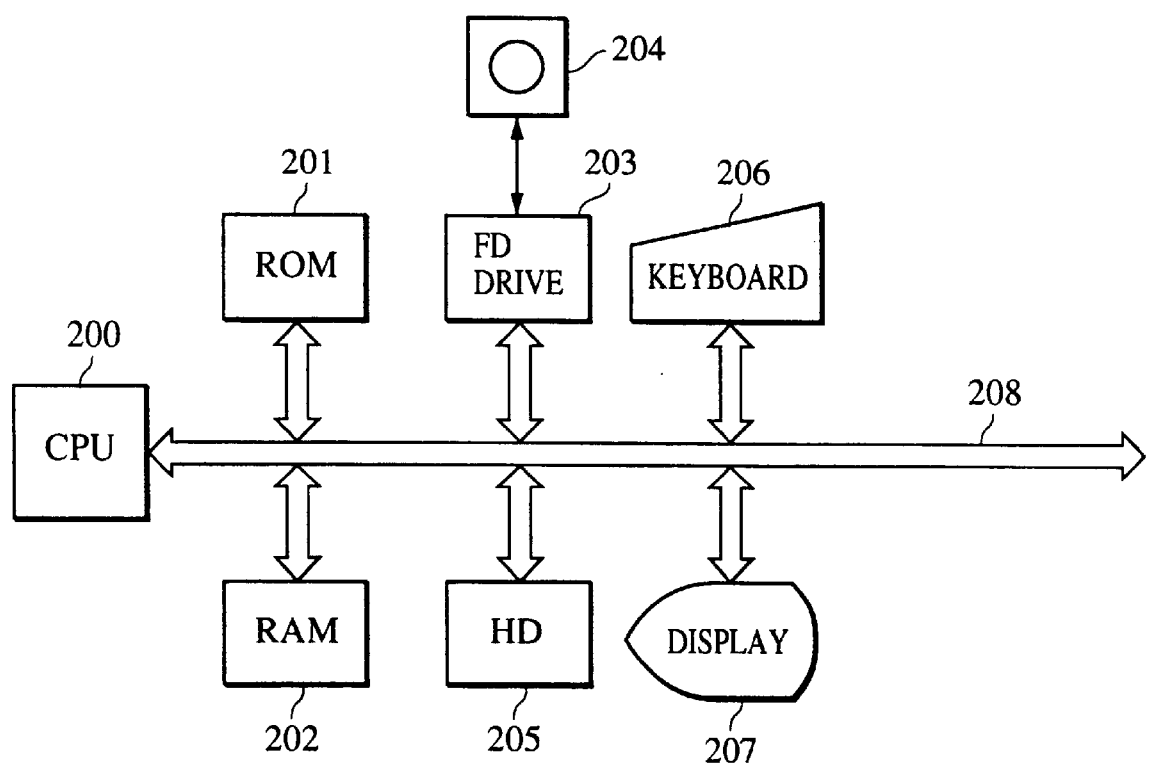
FIG. 2 is a block diagram showing each client computer shown in FIG. 1.

FIG. 2 shows a block diagram showing the structure of the client PC 102. The client PCs 103 and 104 also have the same structure.

A central processing unit (CPU) 200 executes programs such as application programs, printer-driver programs and an QS which are stored in a hard disc (HD) 205, and performs control so that information and files needed to execute each program are temporarily stored in a random access memory (RAM).

In a read only memory (ROM) 201, programs such as a basic input/output (I/O) program, and various types of data such as font data and template data used in document processing are stored. The RAM 202 functions as the main memory and a work area for the CPU 200.

Figure 5:
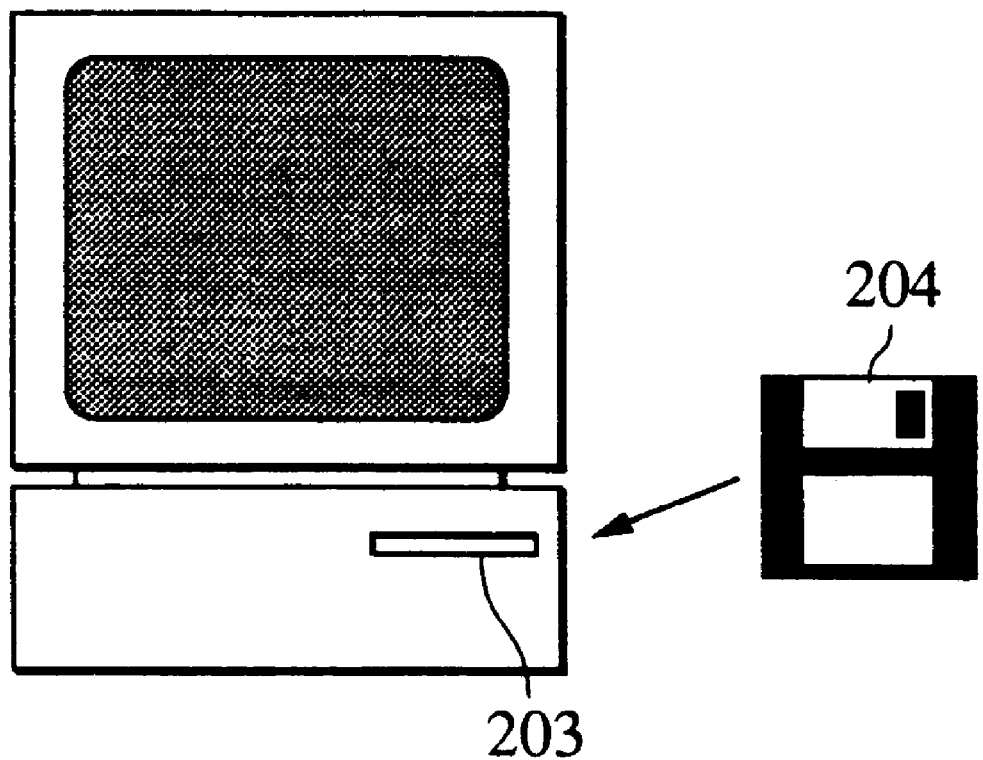
FIG. 5 is a chart showing the relationship between the client PC shown in FIG. 1 and the FD shown in FIG. 2.

As shown in FIG. 5, a network-printer control program including a print-data transmission program stored in a floppy disc (FD) 204 can be loaded from a FD drive 203 into each client PC. The FD 204 holds the printer-driver program etc, which may be stored in storage means such as the HD 205.

Figure 4:
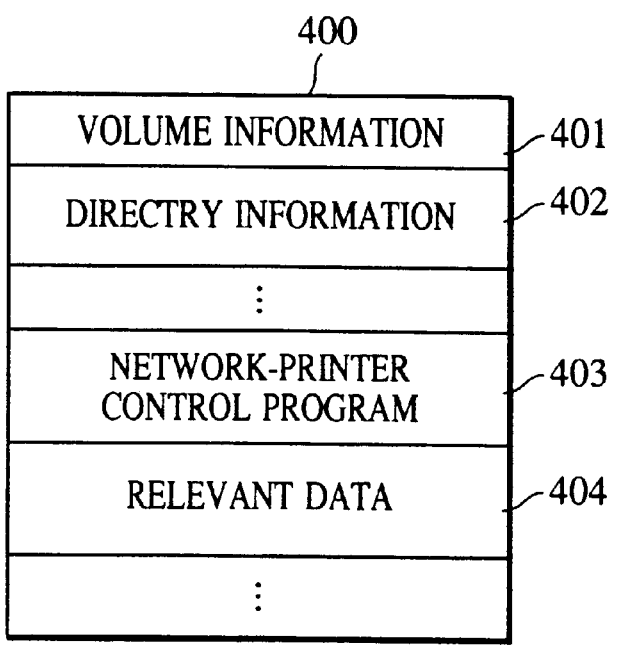
FIG. 4 is a memory map showing data in the FD shown in FIG. 2.

The structure of data contents in the FD 203 is shown in FIG. 4. The data contents 400 in the FD 204 include volume information 401 representing information on data, directory information 402, a network-printer control program 403 formed by program encoding based on flowcharts of the network-printer control program including the print-data transmission program, shown in FIGS. 11, 13 and 15, and relevant data 404 thereto.

Referring further to FIG. 2, the HD 205 holds the application programs, the network-printer control program, the OS, and so forth. A keyboard 206 is used when a user designates commands such as device control commands to be input to the client PC 102. A display 207 displays the command input from the keyboard 206, the condition of the network printer 105, and so forth. A system bus 208 manages a flow of data in the client PC 102.

Figure 3:
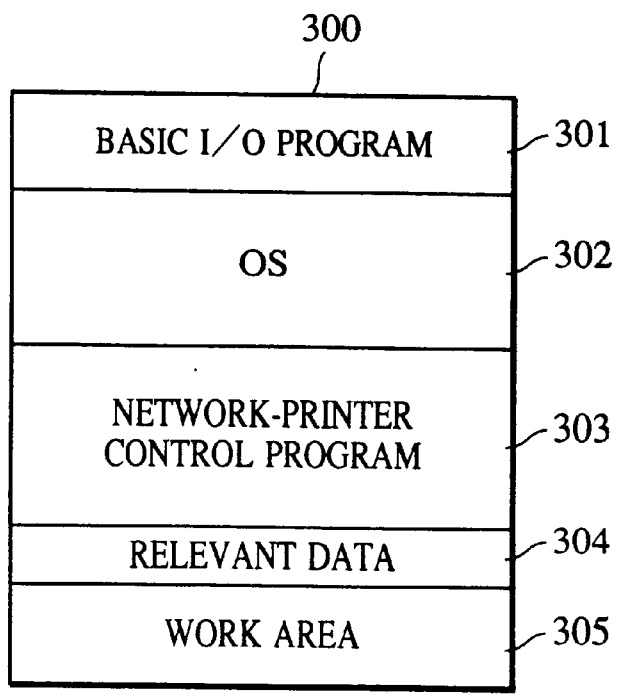
FIG. 3 is a memory map showing a program from a floppy disc (hereinafter referred to as a "FD") shown in FIG. 2, expanded in a random access memory (hereinafter referred to as a "RAM") shown in FIG. 2.

FIG. 3 shows a memory map formed when the network-printer control program including the print-data transmission program are loaded into the RAM 202 and is executable.

The basic I/O program 301 includes a program having an initial program loading (IPL) function etc. for starting the operation of the OS which is loaded from the HD 205 into the RAM 202 when the main power of the client PC 102 is switched on. The OS 302, the network-printer control program 303, and the relevant data 304 are loaded, respectively. A work area 305 is used when the CPU 200 executes the network-printer control program.

Figure 6:
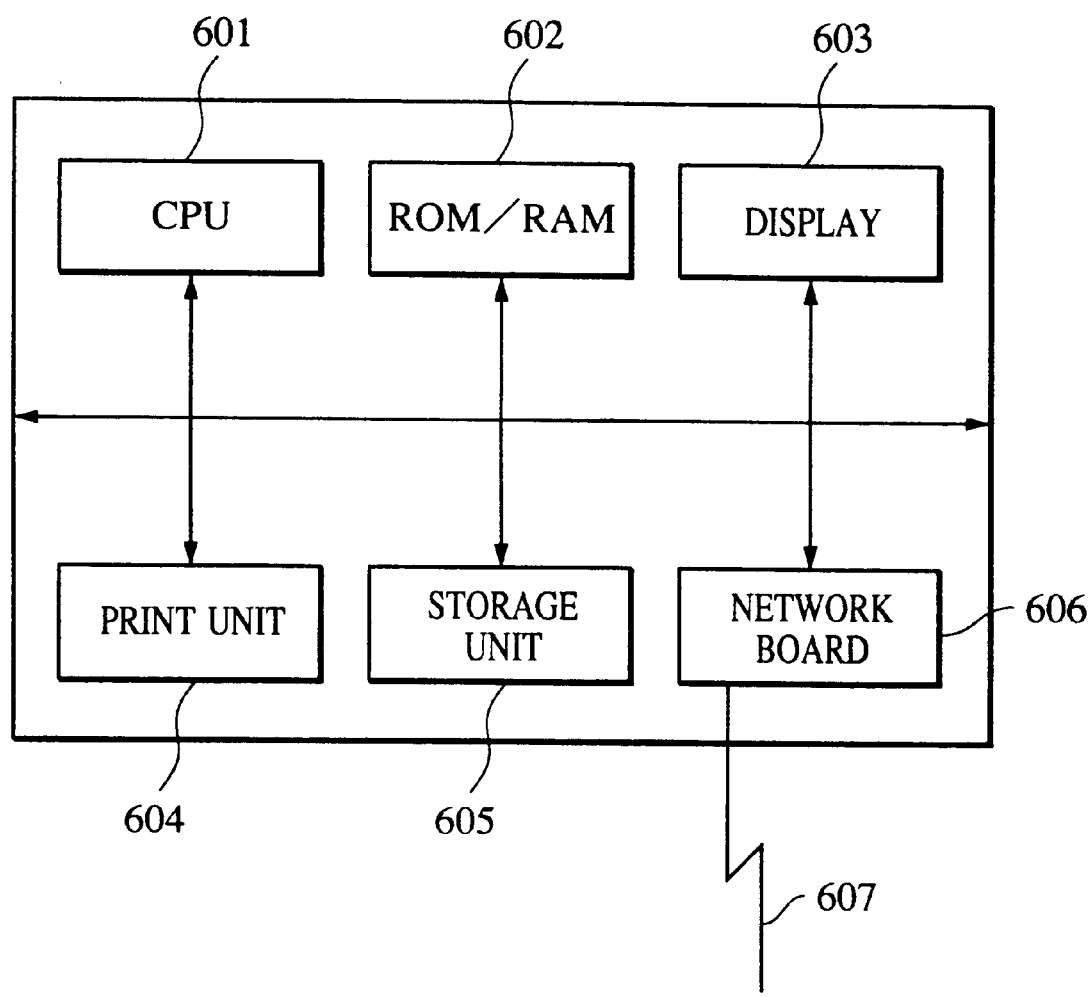
FIG. 6 is a block diagram showing the network printer shown in FIG. 1.

FIG. 6 shows a schematic block diagram of the network printer according to the present invention. Although a laser-beam printer (hereinafter referred to as an "LBP") is used as the network printer 105 in network system, the network printer 105 is not limited to the LBP and another method printer may be used.

In the network printer 105 a CPU 601 performs total control. A ROM/RAM 602 includes a buffer in which a control program for controlling the CPU 601, constant data, and transmission/received data are temporarily stored. The print-interruption program of the present invention (shown in FIGS. 12 and 14) is stored therein.

A storage unit 605 is used similar to the HD 205. For example, the transmission/received data, the control programs and data to be executed by the CPU 501 are stored in the storage unit 605. A display 603 displays the data temporarily stored in the ROM/RAM 602, the contents of data stored in the storage unit 605, operating condition, and so forth.

A print unit 604 prints the bit-map data generated by the CPU 601 based on the program stored in the ROM/RAM 602. Communication of data information such as print data and job information with the external unit such as each client PC and the server is performed via a network board 606. The network board 606 including a RAM, a CPU and a ROM has intelligent functions. The print-interruption program of the present invention is stored in the ROM of the network board 606.

In the present invention the case where the print-interruption program of the present invention is stored in the network board 606 has been described. However, the present invention is not limited thereto. By storing the print-interruption program in the ROM 602 in the network printer 105, the print-interruption method is realized. It need hardly be said that the print-interruption program may be provided to the network printer 105 by means of external storage means such as an FD or a CD-ROM.

A communication line 607 is used to connect the network board 606 and the network.

The network printer 105 also has a control panel (not shown) as designation input means for enabling direct designation by the user.

Figure 7:
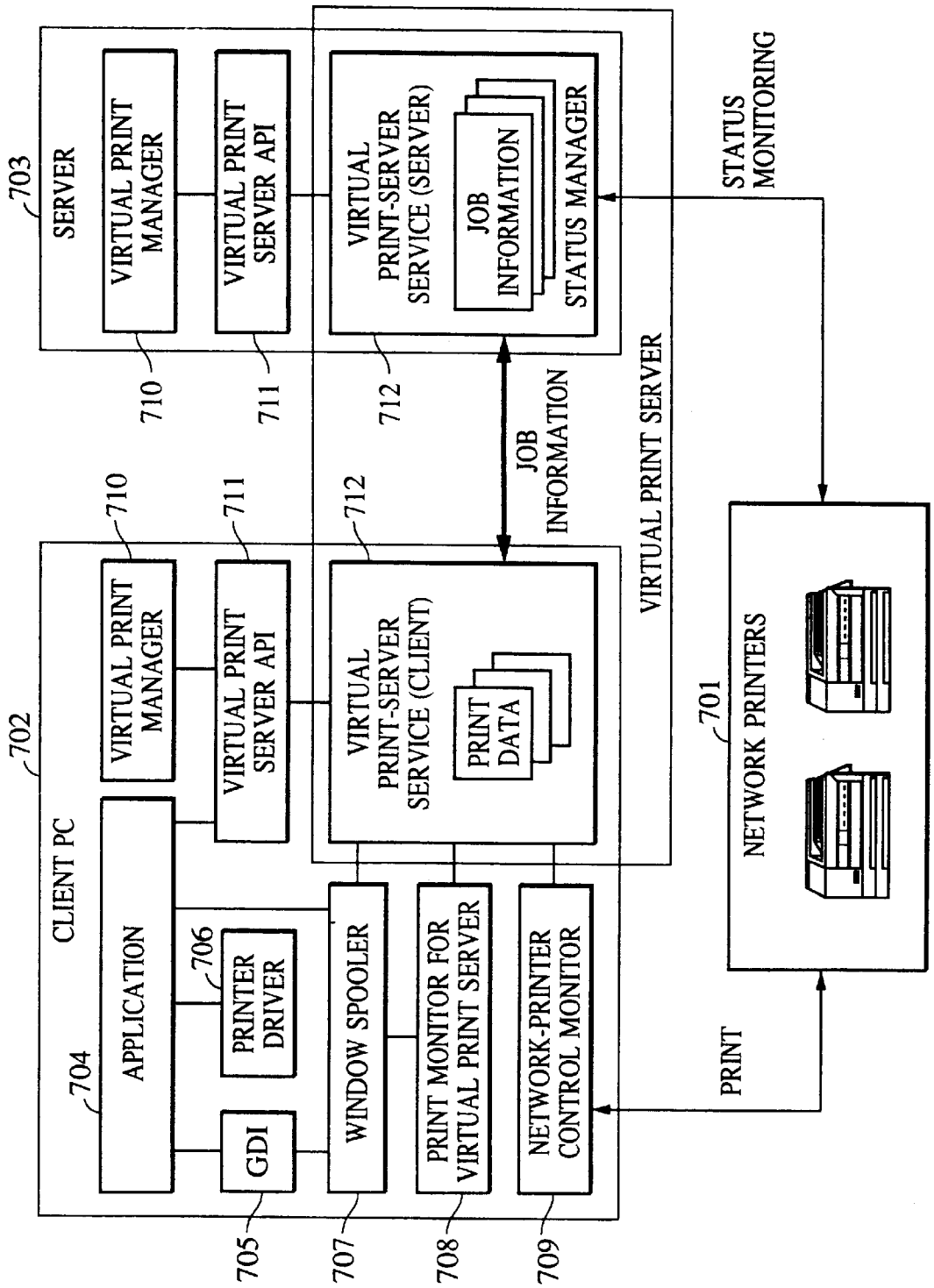
FIG. 7 is a block diagram showing the soft-module structures of the client PC and the server according to the present invention.

FIG. 7 shows a block diagram of the soft-module structure of client PC 702 and server 703 in the system of the present invention.

The block diagram shows a network printer 701, a client-PC soft-module structure 702, a server soft-module structure 703, an application module 704 for providing a network printer system with a print command, a graphics display interface (GDI) 705 for Windows, a printer driver 706 built in Windows, a printer spooler 707 in Windows, a printer monitor 708 for a virtual printer, a control monitor 709 for a network printer, virtual print managers 710, virtual-print-server application interfaces (API) 711, and virtual-print-server services 712.

The virtual print managers 710, the virtual-print-server application interfaces (API) 711, and the virtual-print-server services 712 exist in both the client PC and the server. A combination of the virtual-print-server service (client) and the virtual-print-server service (server), included in the virtual-print-server services 712, is hereinafter called a virtual print server, and this system is hereinafter called a virtual-print-server system.

Figure 8:
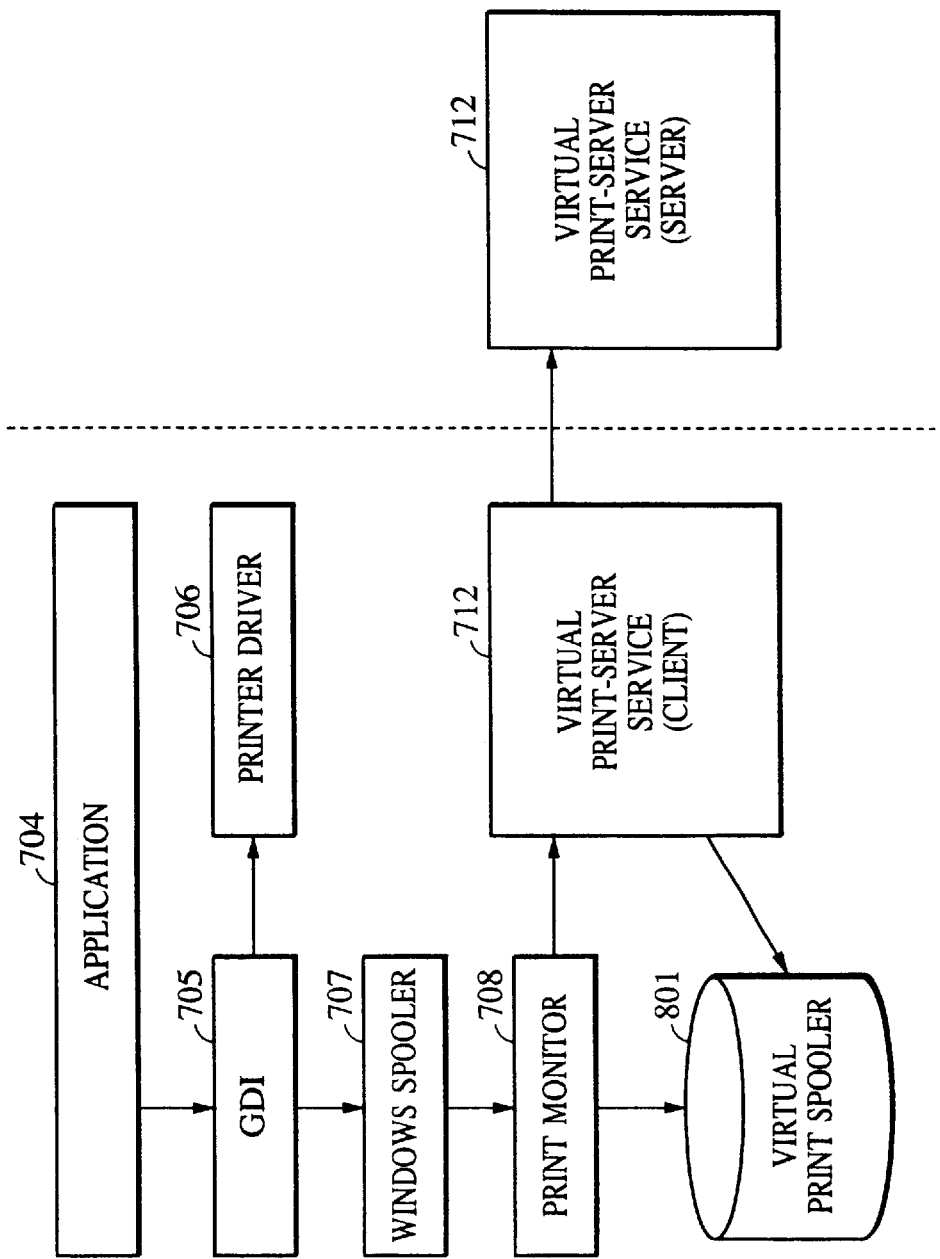
FIG. 8 is a flowchart showing a print monitor process concerning a print function using a virtual print server.
Figure 9:
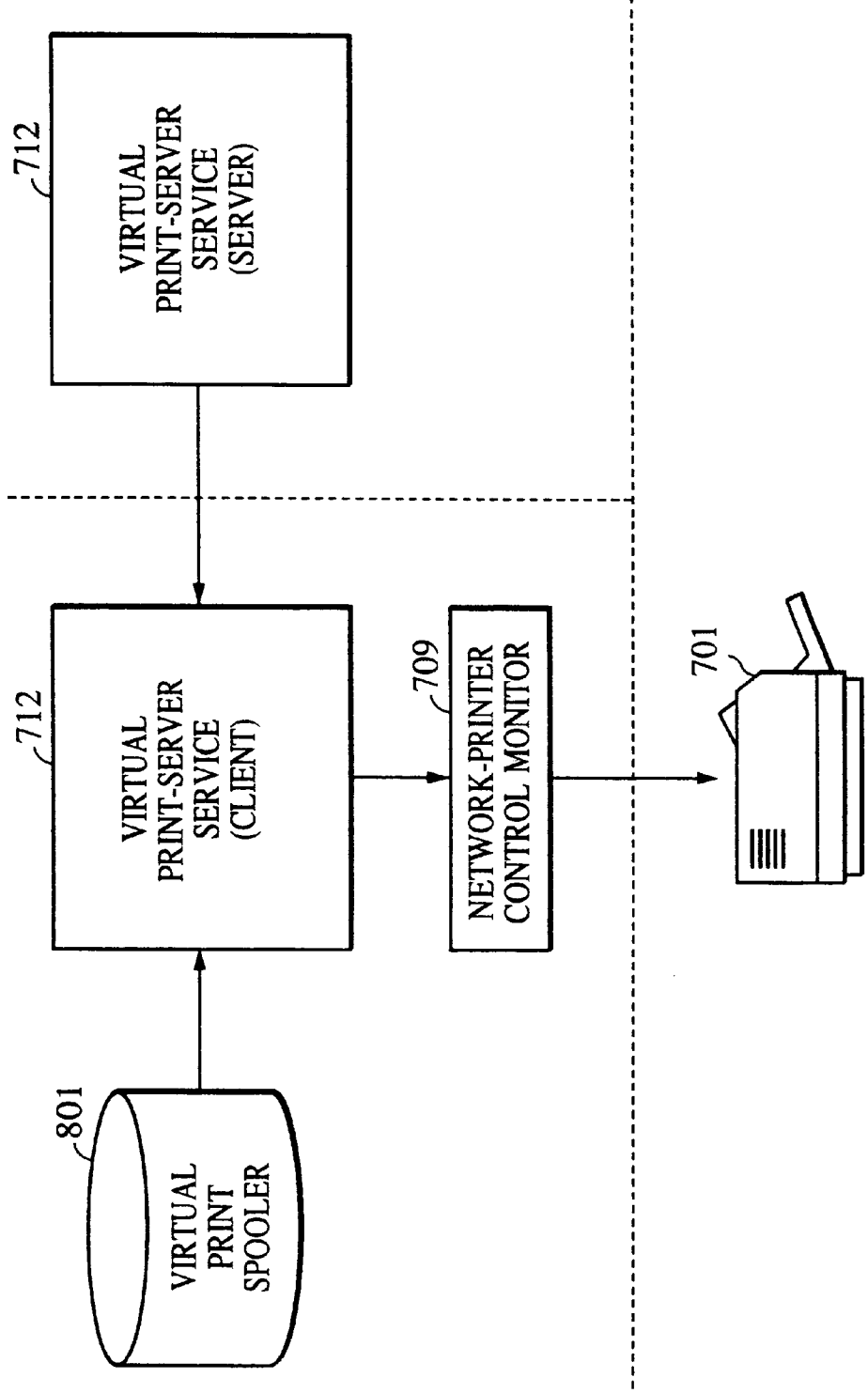
FIG. 9 is a flowchart showing control of a print monitor concerning a print function using a virtual print server.

The operation causing the network printer 105 to print by the client PC 102 in the above-described structure will be described below. The operation uses Windows by way of example for description. A flow of a print operation process performed when the client PC 102 sends a print request to the server 101 is shown in FIG. 8, while a flow of another print process when the server 101 provides the client PC 102 with a print permission for transmission to the network printer 105 is shown in FIG. 9. Description will be continued using identical reference numerals for the block diagram which has been already described. FIGS. 8 and 9 illustrate the flows of the print processes.

On the client PC 702 (102) the application 704 starts printing via the GDI 705. The GDI 705 notifies the Windows spooler 707 and the print monitor 708 (for the virtual print server) of a start of printing. When the print monitor 708 for the virtual print server has been notified of the start of printing, it requests the virtual-print-server service (server) 712 on the server 703 (101) via the virtual-print-server service (client) 712 to start storing print data thereafter. The GDI 705 demands the printer driver 706 to convert the print data into a printer language. The print data converted into the printer language is spooled by the Windows spooler 707. In addition, the printer monitor 708 for the virtual print server receives the print data spooled by the Windows spooler 707 from the Windows spooler 707, and transfers the print data to the virtual-print-server service (client) 712. The virtual-print-server service (client) 712 temporarily stores the received print data in a temporary file (not shown) in a virtual print spooler 801 (shown in FIG. 8) in the HD 205 shown in FIG. 2. When the print data has totally been stored in the temporary file in the virtual print spooler 801 in the HD 205, the virtual-print-server service (client) 712 notifies the virtual server service (server) 712 on the server 703 (101) of a termination of storing the print data, and requests the virtual server service (server) 712 to print. Here the same module of the virtual-print-server service is used by the client PC and the server, and can be set so as to be adapted for the client PC or the server.

FIG. 9 shows a process in which the turn of the print job previously registered in the virtual-print-server service comes for printing by the server's management, and the print data is actually transmitted to the network printer. The virtual-print-server service (server) 712 sends a print-permission command to the client PC having the print job whose turn has come for printing. The virtual-print-server service (server) 712 having received the command reads the print data temporarily stored in the virtual print spooler 801 as described above, and transfers the read data to the control monitor 709 for the network printer. The control monitor 709 for the network printer transfers the print data to the network printer 701 by means of a print communication protocol, and the network printer 701 prints.

Figure 10:
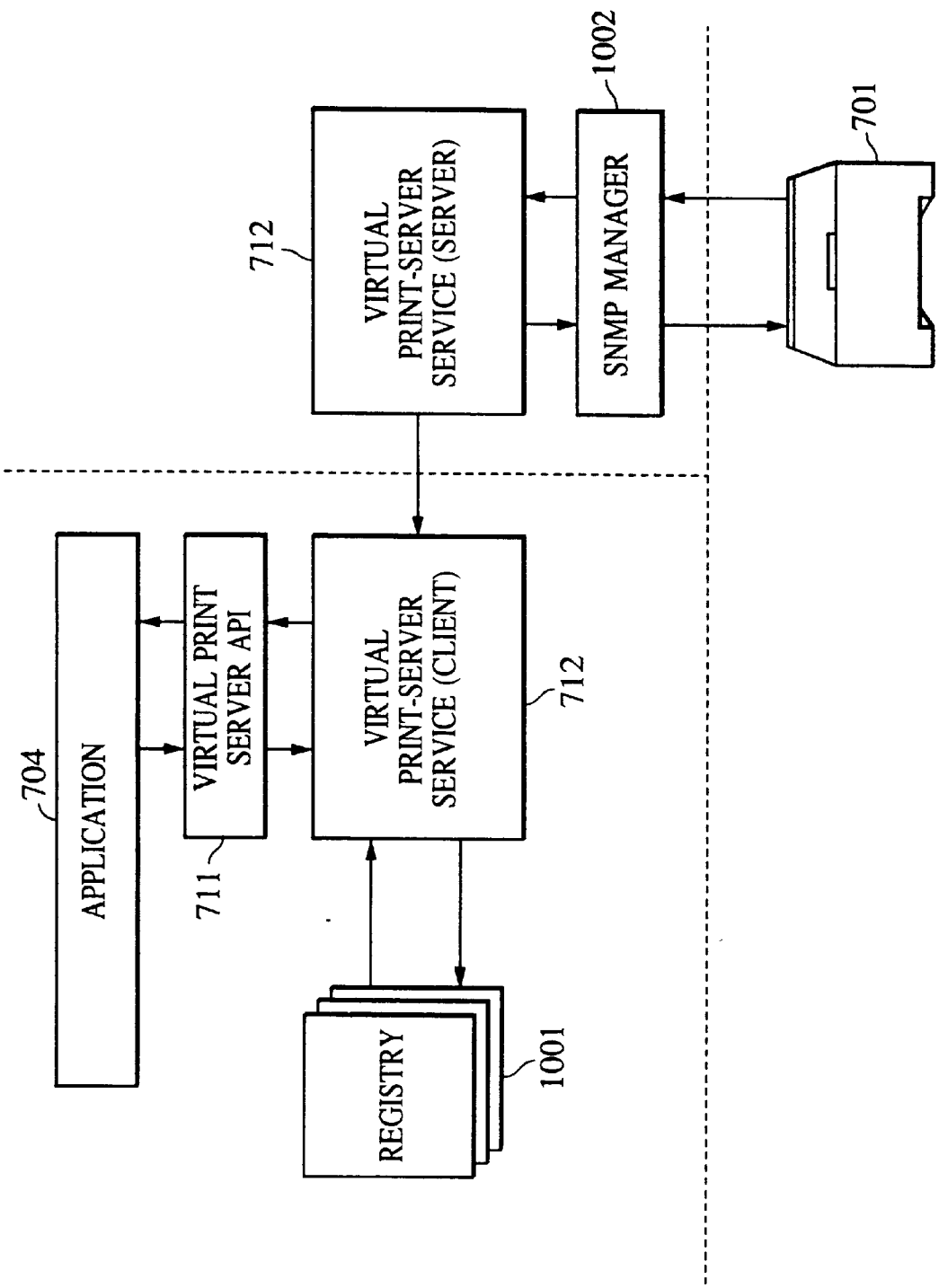
FIG. 10 is a flowchart showing a print process performed when a print request is performed from the client PC to the server, both shown in FIG. 1.

A process for notifying the client PC of the status of the network printer 701 will be described using the Windows by way of example. A flow of the printer status is shown in FIG. 10.

In the present invention the virtual-print-server service (server) 712 requests a simple-network-management protocol manager (hereinafter referred to as an "SNMP manager") 1002 to collect the status of the network printer 701 at intervals of five seconds (default). The SNMP manager 1002 requests the network printer 701 to collect its status. The network printer 701 responds with its present printer status. When the status of the network printer 701 changes, the virtual-print-server service (server) 712 notifies the client PC using the network printer 701 of the status change. The printer-status change notification sent from the server is received by the virtual-print-server service (client) 712 in the client PC, and the printer status is stored in a registry 1001 in the RAM in the client PC. The application 704 can obtain the printer status stored in the registry 1001.

In the above manner the virtual print server system performs the print processes.

In this embodiment Windows NT (registered trademark) is used. The print monitor 708, the virtual print spooler, the virtual print server system (client/server) 712, and the control monitor 709 for the network printer have been newly produced according to the present invention. The other modules are based on Windows NT standards. However, the modules are not limited to Windows NT standard modules but may be structured using other operating systems such as Operating System/2.

First Embodiment

According to a first embodiment of the present invention, a print interruption process is performed by a client PC as a transmitting end.

Figure 11:
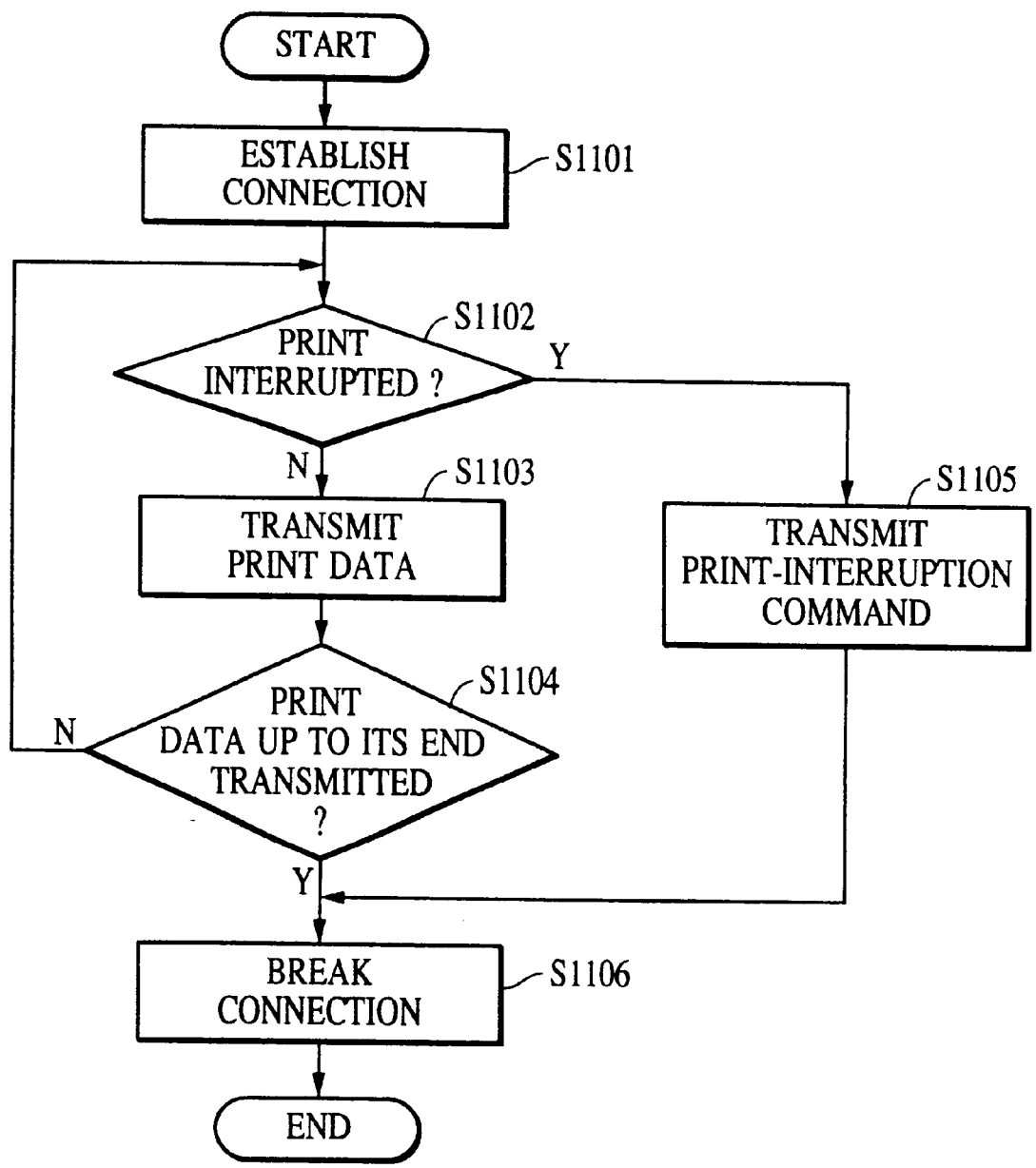
FIG. 11 is a flowchart of a computer operation showing a print interruption method according to a first embodiment of the present invention.

FIG. 11 shows a flowchart of control of each client PC by a print-data transmission program operating on the client PC. The print-data transmission program is part of the network-printer control program of the present invention, and is stored in the ROM 201, the RAM 202 or HD 205.

At first, when a user designates a print process to start, the print-data transmission program is initiated and the process proceeds to step S1101. In step S1101 the connection between the network computer and the client PC is established. In step S1102 determination of whether or not the user has demanded print interruption is performed. If the user has demanded the print interruption, the process proceeds to step S1105. If the user has not demanded the print interruption, the process proceeds to step S1103.

In step S1103 the print data is transmitted to the network printer 105. In step S1104 determination of whether or not the print data has totally been transmitted is performed. If the print data has totally been transmitted, the process proceeds to step S1106. If the transmission to the end of the print data is incomplete, the process returns to step S1102. In step S1106 a connection break command is transmitted to the network printer 105, and the connection is broken to terminate the process.

In step S1105 the print interruption has been demanded by the user. Thus, the print-data transmission program transmits a print interruption command to the network printer 105, and the process proceeds to step S1106.

Figure 12:
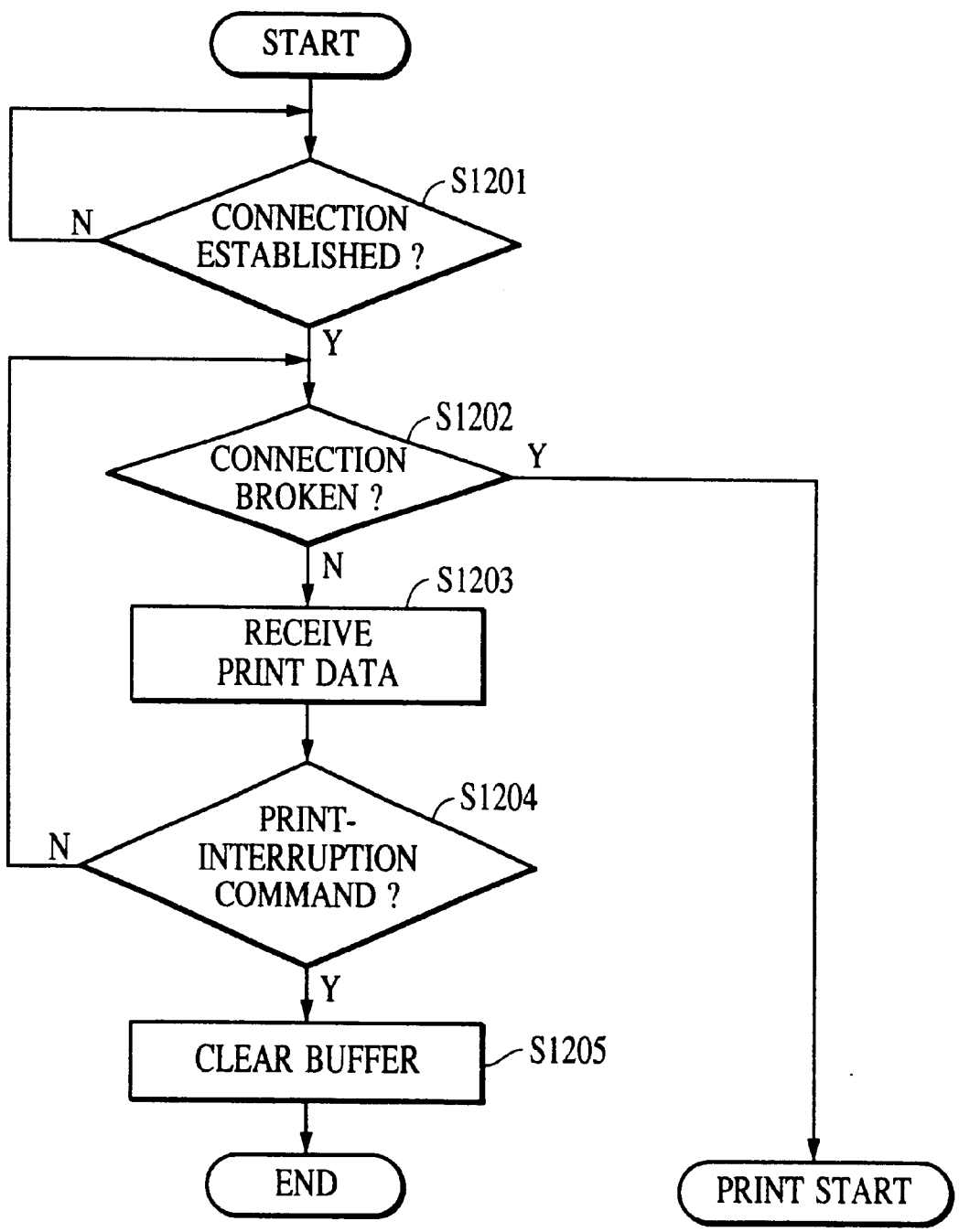
FIG. 12 is a flowchart of a network-printer operation showing the print interruption method according to the first embodiment of the present invention.

FIG. 12 shows a flowchart of control of the network printer 105 by the print interruption program operating on the network printer 105. The print interruption program is stored in the storage medium (not shown) in the network board 606 (shown in FIG. 6) as described above.

In step S1201 the print interruption program determines whether or not the connection with the client PC has been established. Step S1201 is repeated until the connection is established. When the print interruption program determines that the connection has been established, the process proceeds to step S1202. In step S1202 determination of whether or not the connection with the client PC has been broken is performed. A connection break command is transmitted from the client PC to the network printer 105, and the determination is performed by a CPU on the network board 606. When the connection is broken, printing is started, and when the connection break command is not transmitted the process proceeds to step S1203. Here determination of the print start is performed based on transmission of the connection break command. Differently therefrom, by determining whether or not a job termination command from the client PC has been received, a termination of job transmission may be determined.

In step S1203 the print data from the client PC is received. In step S1204 determination of whether or not the print data received by the network printer 105 is a print interruption command is performed. The determination is performed such that the CPU on the network board 606 (shown in FIG. 6) analyzes the print data. If no print interruption command is included in the print data analyzed by the network board 606, the process returns to step S1202. If the print interruption command is included in the print data, the process proceeds to step S1205.

In step S1205 the network board 606 having determined the existence of the print interruption command clears the received data in the network board 606 and a buffer in the network printer 105 holding the print data, and terminates the process. The clearing of the buffer is to delete all the data in the buffer so that successively sent data is normally printed. The print data in the network printer 105 is controlled so that deletion of the print data by the network printer 105 is performed by transmission of a deletion command by the network board 606 to the network printer 105.

As described above, according to the first embodiment of the present invention, when the client PC receives a print interruption command while transmitting a print data to the network printer 105, the client PC transmits the print interruption command to the network printer 105, thereby the network board 606 included the network printer 105 determines a print interruption, and the buffers of the network board 606 and the network printer 105 are cleared. Thus, unnecessary output can be reduced, and successively sent print data are free from the influence of character changing.

Second Embodiment

According to a second embodiment of the present invention, an interruption process performed by the network board 606 as a receiving end is shown.

Figure 13:
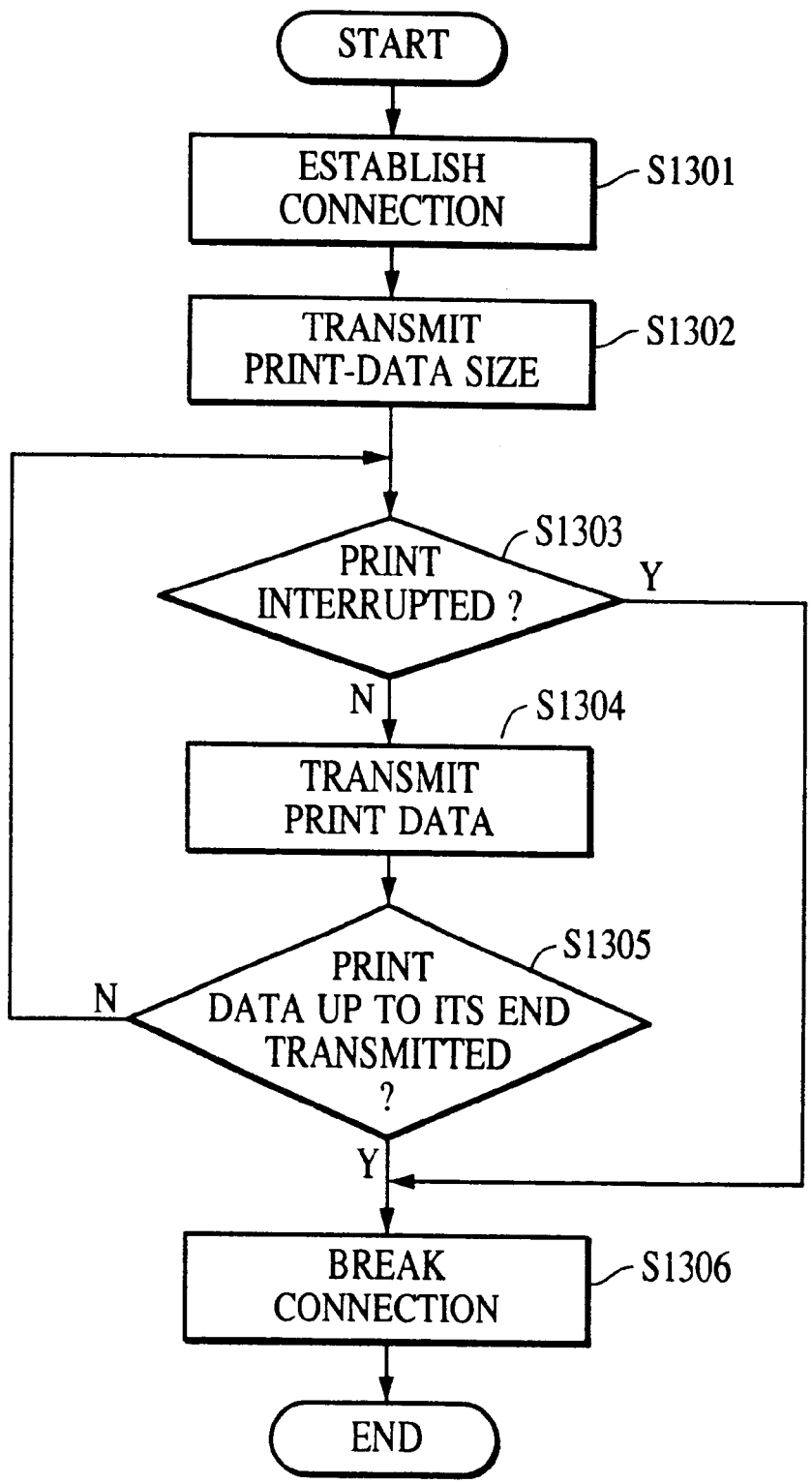
FIG. 13 is a flowchart of a computer operation showing a print interruption method according to a second embodiment of the present invention.

FIG. 13 shows a flowchart of control of each client PC by a print-data transmission program operating on the client PC. The print-data transmission program is part of the network-printer control program of the present invention, and is stored in the ROM 201, the RAM 202 or the HD 205.

In step S1301 the print-data transmission program performs control so that the connection between the client PC and the network printer 105 is established. In step S1302 the print-data transmission program performs control so that the size of the print data is transmitted earlier than the print data from the client PC to the network printer 105.

In step S1303 the print-data transmission program determines whether or not a print interruption has been designated by the user. If it determines that the print interruption has been designated, the process proceeds to step S1306, in which the print-data transmission program performs control, transmitting a connection break command from the client PC to the network printer 105 to break the connection, and the process terminates. In step S1303 the print-data transmission program determines that the print interruption has not been designated by the user, the process proceeds to step S1304.

In step S1304 the client PC transmits the print data to the network printer 105. In step S1305 the client PC determines whether or not the print data has totally been transmitted to the network printer 105. If the client PC determines that the print data has totally been transmitted, the process proceeds to step S1306. The connection break command is transmitted to the network printer 105, and the connection is broken to terminate the process. If the print data has not totally been transmitted to the network printer 105, the process returns to step S1303.

Figure 14:
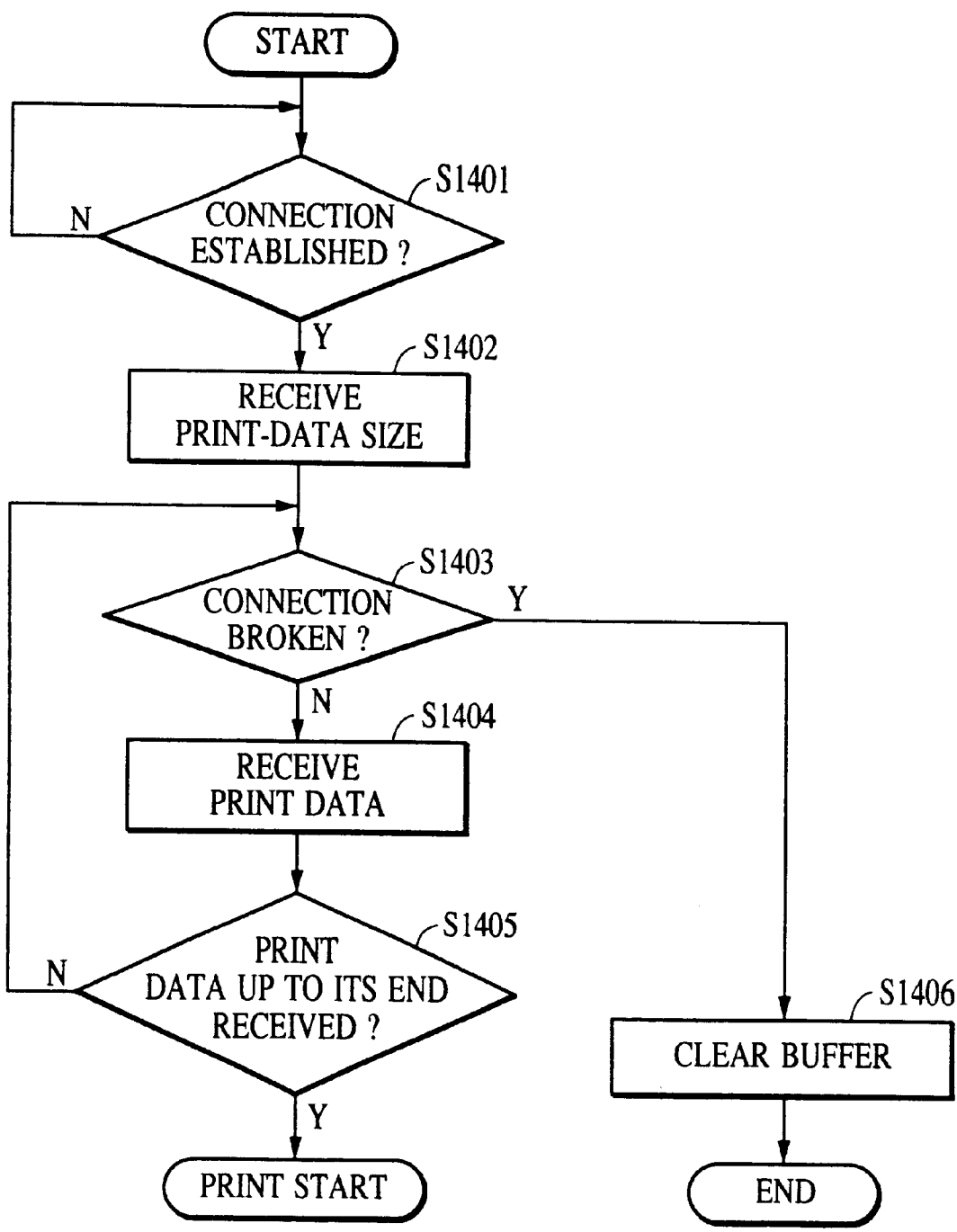
FIG. 14 is a flowchart of a network-printer operation showing the print interruption method according to the second embodiment of the present invention.

FIG. 14 shows a flowchart of control of the network printer 105 by the print interruption program operating on the network printer 105. The print interruption program is stored in the storage medium (not shown) such as the ROM in the above-described network board 606.

In step S1401 the print interruption program determines whether or not the connection between the network PC and the network printer 105 has been established. Step S1401 is repeated until the connection is established. When the connection has been established, the process proceeds to step S1402, where the network printer 105 receives the size of the print data to be received by the client PC. In step S1403 determination of whether or not the connection is broken is performed. The determination is performed based on whether or not a connection break command has been sent from the client PC to the network printer 105. If the connection is broken, the process proceeds to step S1406, and as described in the first embodiment, the print interruption program totally clears data in the buffer of the network board 606 holding the received data and the buffer of the network printer 105 holding the print data, and the process terminates. If the connection is not broken, the process proceeds to step S1404.

In step S1404 the network printer 105 receives the print data from the client PC, and the process proceeds to step S1405. In step S1405 the print data size initially received by the network printer 105 and the size of data actually received from the client PC are measured, and the total of the measured size is compared. When it is determined that the network printer 105 has received the total print data, a print process is started. If the total size of the data actually received from the client PC is less than the initially received print-data size, the process returns to step S1403.

As described above, according to the second embodiment of the present invention, the client PC transmits to the network printer 105 the size of print data before transmitting the print data. Thus, when the client PC receives a print interruption command from the user while transmitting the print data, even if the reception of the print data terminates and the connection breaks before the print data is totally transmitted, the network board 606 included the network printer 105 itself can determine a print interruption by breaking the connection, and clears the print data in the network board 606 and the reception buffer in the network printer 105. Thus, unnecessary output can be reduced, and print data successively sent are free from the influence of character changing.

Third Embodiment

Figure 15:
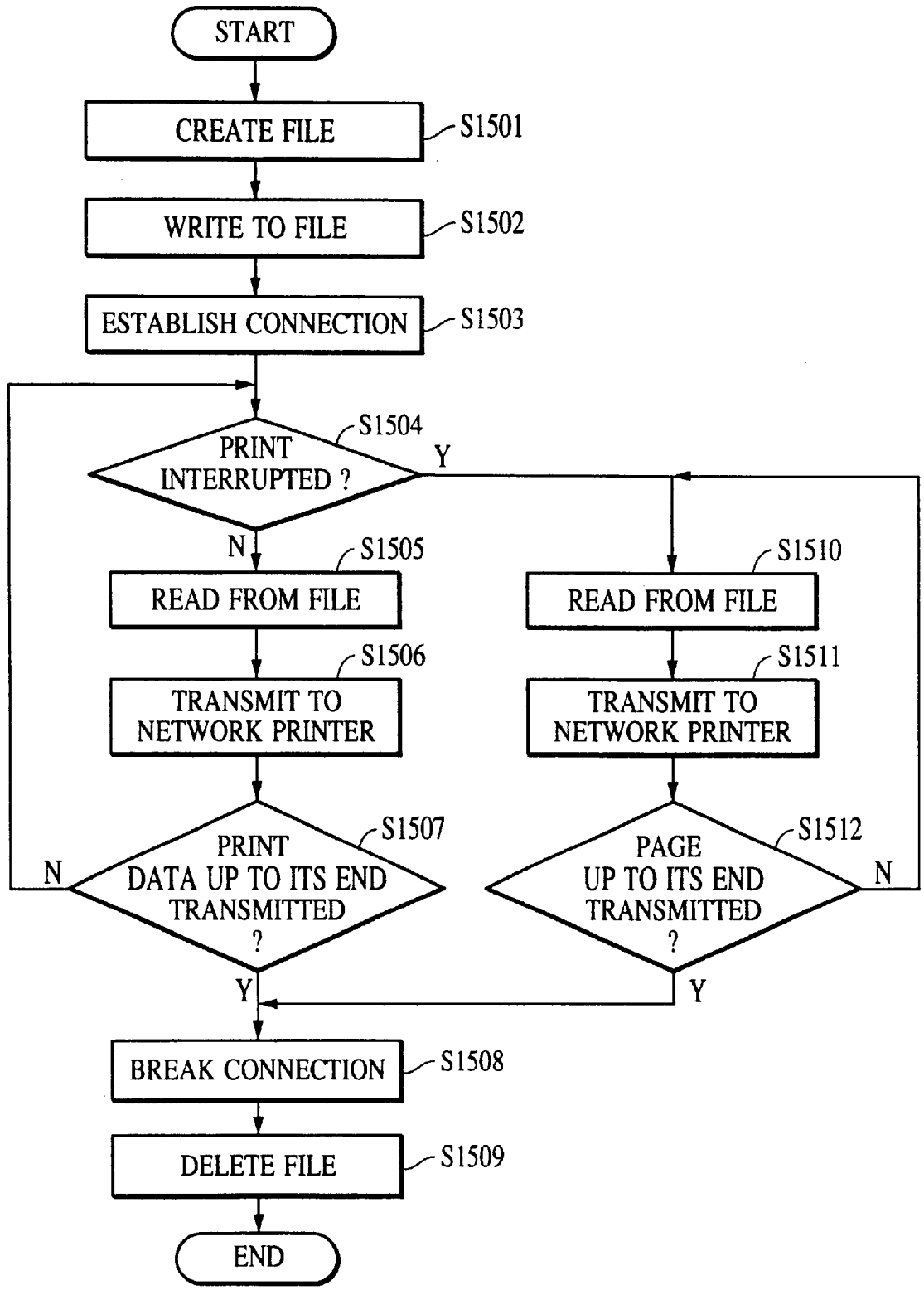
FIG. 15 is a flowchart of a network-printer operation showing a print interruption method according to a third embodiment of the present invention.

FIG. 15 shows a flowchart of a print-data transmission program operating on each client PC. The print-data transmission program is part of the network-printer control program of the present invention. The print-data transmission program is stored in the storage medium (not shown) in the network board 606.

In step S1501 the print-data transmission program uses the CPU 200 to create a file used to temporarily hold print data converted into a page description language by a printer driver stored in the HD 205.

In step S1502 the print-data transmission program once writes a total of the page description language-converted print data into the new file. In step S1503 the print-data transmission program performs control so that the client PC establishes connection with the network printer 105. Actually, the connection can be established such that the client PC sends a connection demand packet to the network printer 105 and obtains a response packet form the network printer 105.

In step S1504 the print-data transmission program controls the CPU 200 to determine whether or not it has received a print interruption request from the user. If the CPU 200 has received the print interruption request, the process proceeds to step S1510. If the CPU 200 has not received the print interruption request, the process proceeds to step S1505.

In step S1505 the print-data transmission program reads the print data from the file. In step S1506 the print-data transmission program transmits the print data to the network printer 105. In step S1507 the print-data transmission program determines whether or not it has totally transmitted the print data. If it has totally transmitted the print data, the process proceeds to step S1508. If there is the remaining print data having not been transmitted, the process returns to step S1504.

Similarly, in step S1510 the print-data transmission program reads the print data from the file, and in step S1511 the print-data transmission program transmits the print data to the network printer 105. However, in step S1512 the print-data transmission program uses the CPU 200 to analyze the print data so as to determine whether or not the print data has been transmitted up to the end of a page being transmitted. If the print data includes a form-feed command, the print data up to the form-feed command can be recognized as one page. If transmitting the print data up to its end, the print-data transmission program finally adds a job termination command to the last page of the print data, and transmits it to the network printer 105, and the process proceeds to step S1508. If not, the process returns to step S1510.

In step S1508 the connection with the network printer 105 is broken. The connection break can be determined such that the client PC transmits a break demand packet to the network printer 105, and a response packet is transmitted from the network printer 105. In step S1509 the CPU 200 deletes the file created in step S1501 to terminate the process.

The network printer performs normal processing. When the connection is deleted the reception terminates. In the third embodiment, the reception buffer has data just for one page, so that output up to the page is performed based on the form-feed command or job termination command. Thus, the reception buffer has no data, and a successively sent job can be output without character changing.

As described above, according to the third embodiment of the present invention, by causing the client PC to store the print data in a predetermined file, even if a print interruption is demanded by the user in transmission, the print data up to its end can be transmitted. Thus, the network printer 105 outputs the print data up to the received page, which provides a successively sent job free form character changing.

Fourth Embodiment

According to a fourth embodiment of the present invention, control considering a timeout in printing in the process by the network board 606 described in the second embodiment will be described.

When a timer for measuring the duration of a loop from step S1403 to step S1405 (shown in FIG. 14) is activated, and the print data cannot be received up to its end after a predetermined time, the print interruption program recognizes that some problem occurs in data transmission from the client PC, and breaks the connection to the network PC. The process proceeds to step S1406, in which the print interruption program deletes the received data in the network board 606 and the network printer 105.

The measurement by the timer is started when the print data is received. In other words, reception of the print data sets zero in the timer. For example, when the timer has a value of 1000, a timeout process is activated. If reception of the print data is started in the middle of the measurement, the timer is controlled to have a value of zero again.

In addition, the fourth embodiment of the present invention realizes the timeout process on the print system according to the second embodiment. However, the timeout process is realized in, for example, the first embodiment.

Even if the client PC as the print-data transmitting end is out of order and no print data is transmitted therefrom for a long time while connection is being maintained, the above-described timeout process performs control such that no transmission of print data for a certain time forces the network printer 105 to break connection and deletes the received data. Thus, successively sent print data can be normally printed.

As described above, according to the first embodiment of the present invention, the network printer 105 can be notified by a command that transmission of print data is interrupted, and can delete the print data transmitted for part of a page in its buffer. As a result, after transmission of print data is interrupted, the network printer 105 can continue normal printing if receives another new print data from the network printer 105.

According to the second embodiment of the present invention, the network printer 105 can be notified of the interruption of print data transmission by the breaking of connection. The network printer can determine whether or not transmitted print data is normal by comparing the data size of the transmitted print data with a data size earlier transmitted from the client PC. The network printer 105 can delete print data transmitted for part of a page in its buffer. As a result, after transmission of print data is interrupted, the network printer 105 can continue normal printing if receives another new print data from the network printer 105.

According to the third embodiment of the present invention, print data is stored in a file in advance. Thus, even if print interruption is demanded by the user in the transmission of the print data, each client PC can interrupt transmitting the print data after transmitting the print data up to the page end. As a result, after transmission of print data is interrupted, the network printer 105 can continue normal printing if receives another new print data from the network printer 105.

According to the fourth embodiment of the present invention, when no print data is transmitted for a long time from each client PC to the network PC, the network printer 105 is forced to break connection and delete the received data. Thus, even if an error occurs in transmission of print data while connection is being maintained, restoration can be performed, and successively transmitted print data can be normally printed.

What is claimed is:

1. An output control apparatus comprising:
   a receiver circuit adapted to receive print data and size information thereof from an external unit;
   a memory in which the print data received by said receiver circuit is stored;
   a calculation circuit adapted to calculate a size of the print data received by said receiver circuit;
   a comparison circuit adapted to compare the size of the print data calculated by said calculation circuit and the size information received by said receiver circuit;
   an erasing circuit adapted to erase the data stored in said memory; and
   a control circuit adapted to control said erasing circuit so that, when the size of the print data and the size information, compared by said comparison circuit, differ at an end of reception of the print data from said receiver circuit, the data stored in said memory is erased by said erasing circuit.

2. An output control apparatus according to claim 1, further comprising:
   an expansion circuit adapted to expand the data stored in said memory into image data; and
   an output unit for printing the image data formed by said expansion circuit.

3. An output control apparatus according to claim 1, wherein said output control apparatus is a network board for receiving data from the external apparatus via a network, and for transmitting the received data to a printing apparatus.

4. An output control apparatus comprising:
   a receiver circuit adapted to receive print data from an external unit;
   a memory in which the print data received by said receiver circuit is stored;
   an erasing circuit adapted to erase the print data stored in said memory;
   a derivation circuit adapted to derive time information representing a lapse of time from a final reception of the print data by said receiver circuit; and
   a control circuit adapted to control the erasing circuit so that, during reception of the print data from the external unit, when a time based on the time information derived by said derivation circuit is more than a predetermined time, the print data stored in said memory is erased by said erasing circuit.

5. An output control apparatus according to claim 4, further comprising:
   an expansion circuit adapted to expand the print data stored in said memory into image data in an expansion region; and
   an output unit for printing the image data formed in the expansion region by said expansion circuit.

6. An output control apparatus according to claim 4, wherein said erasing circuit erases the print data stored in said memory, and transmits a command for erasing print data in another memory.

7. An output control apparatus according to claim 4, wherein, during reception of the print data form the external unit, when a time based on the time information derived by said derivation circuit is more than the predetermined time, said control circuit performs a control operation so that connection to the external unit is broken.

8. An output control apparatus according to claim 4, wherein said output control apparatus is a network board for receiving data from the external apparatus via a network, and for transmitting the received data to a printing apparatus.

9. An output control method for an output control apparatus, said method comprising the steps of:

receiving print data and size information thereof from an external unit;

storing in a memory the print data received in said receiving step;

calculating a size of the print data received in said receiving step;

comparing the size of the print data calculated in said calculating step and the size information received in said receiving step;

erasing the data stored in the memory; and controlling said erasing step so that, when the size of the print data and the size information, compared in said comparing step, differ at an end of reception of the print data in said receiving step, the data stored in the memory is erased in said erasing step.

10. An output control method according to claim 9, further comprising the steps of:

expanding the data stored in the memory into image data; and printing the image data formed in said expanding step.

11. An output control method according to claim 9, wherein the output control apparatus is a network board for receiving data from the external apparatus via a network, and for transmitting the received data to a printing apparatus.

12. A computer-readable memory medium storing a program for implementing an output control method for an output control apparatus, the program comprising:

code for a receiving step of receiving print data and size information thereof from an external unit;

code for a storing step of storing in a memory the print data received in the receiving step;

code for a calculating step of calculating a size of the print data received in the receiving step;

code for a comparing step of comparing the size of the print data calculated in the calculating step and the size information received in the receiving step;

code for an erasing step of erasing the data stored in the memory; and code for a controlling step of controlling the erasing step so that, when the size of the print data and the size information, compared in the comparing step, differ at an end of reception of the print data in the receiving step, the data stored in the memory is erased in the erasing step.

13. A memory medium according to claim 12, wherein the program further comprises:

code for an expanding step of expanding the data stored in the memory into image data; and code for a printing step of printing the image data formed in the expanding step.

14. A memory medium according to claim 12, wherein the output control apparatus is a network board for receiving data from the external apparatus via a network, and for transmitting the received data to a printing apparatus.

15. An output control apparatus comprising:

receiving means for receiving print data and size information thereof from an external unit;

memory means for storing the print data received by said receiving means;

calculation means for calculating a size of the print data received by said receiving means;

comparison means for comparing the size of the print data calculated by said calculation means and the size information received by said receiving means;

erasing means for erasing the data stored in said memory means; and control means for controlling said erasing means so that, when the size of the print data and the size information, compared by said comparison means, differ at an end of reception of the print data from said receiving means, the data stored in said memory means is erased by said erasing means.

16. An output control apparatus according to claim 15, further comprising:

expansion means for expanding the data stored in said memory means into image data; and output means for printing the image data formed by said expansion means.

17. An output control apparatus according to claim 15, wherein said output control apparatus is a network board for receiving data from the external apparatus via a network, and for transmitting the received data to a printing apparatus.

18. An output control apparatus comprising:

receiving means for receiving print data from an external unit;

memory means for storing the print data received by said receiving means;

erasing means for erasing the print data stored in said memory means;

deriving means for deriving time information representing a lapse of time from a final reception of the print data by said receiving means; and control means for controlling the erasing means so that, during reception of the print data from the external unit, when a time based on the time information derived by said deriving means is more than a predetermined time, the print data stored in said memory means is erased by said erasing means.

19. An output control apparatus according to claim 18, further comprising:

expansion means for expanding the print data stored in said memory means into image data in an expansion region; and output means for printing the image data formed in the expansion region by said expansion means.

20. An output control apparatus according to claim 18, wherein said erasing means erases the print data stored in said memory means, and transmits a command for erasing print data in another memory means.

21. An output control apparatus according to claim 18, wherein, during reception of the print data form the external unit, when a time based on the time information derived by said deriving means is more than the predetermined time, said control means performs a control operation so that connection to the external unit is broken.

22. An output control apparatus according to claim 18, wherein said output control apparatus is a network board for receiving data from the external apparatus via a network, and for transmitting the received data to a printing apparatus.

* * * * *

UNITED STATES PATENT AND TRADEMARK OFFICE
CERTIFICATE OF CORRECTION

PATENT NO. : 6,226,097 B1
DATED : May 1, 2001
INVENTOR(S) : Mitsuo Kimura

It is certified that error appears in the above-identified patent and that said Letters Patent is hereby corrected as shown below:

Title page,
Item [57], ABSTRACT, line 5, "clear" should read -- clears --.

Drawings,
Sheet 3 of 14, Figure 4, DIRECTRY" should read -- DIRECTORY --.

Column 4,
Line 47, "QS" should read -- OS --; and
Line 60, "etc," should read -- etc., --.

Column 5,
Line 14, "are" should read -- is --.

Column 8,
Line 54, "included" should read -- included in --.

Column 9,
Line 16, "In" should read -- If in --.

Column 10,
Line 3, "included" should read -- included in --; and
Line 28, "form" should read -- from --.

Column 11,
Line 13, "form" should read -- from --;
Line 54, "if" should read -- if it --; and
Line 66, "if" should read -- if it --.

Column 12,
Line 7, "if" should read -- if it --.

UNITED STATES PATENT AND TRADEMARK OFFICE
CERTIFICATE OF CORRECTION

PATENT NO.   : 6,226,097 B1
DATED        : May 1, 2001
INVENTOR(S)  : Mitsuo Kimura It is certified that error appears in the above-identified patent and that said Letters Patent is hereby corrected as shown below:

Column 13,
Line 6, "form" should read -- from --.

Column 15,
Line 2, "form" should read -- from --.

Signed and Sealed this

Fifth Day of March, 2002

*Attest:*

JAMES E. ROGAN
*Director of the United States Patent and Trademark Office*

*Attesting Officer*